Patented Nov. 7, 1950

2,529,300

UNITED STATES PATENT OFFICE 2,529,300

LUBRICATING OIL COMPOSITIONS

Eugene Lieber, Chicago, Ill., assignor to Standard Oil Development Company, a corporation of Delaware No Drawing. Original application October 24, 1944, Serial No. 560,193. Divided and this application October 28, 1948, Serial No. 57,133

4 Claims. (Cl. 252—52)

This invention relates to a novel type of chemical condensation product and to methods of preparing such products and using them for various purposes, more particularly as pour depressors in waxy lubricating oils.

One object of the present invention is to make wax modifiers especially useful as pour depressors in waxy lubricating oils from raw materials not heretofore known to be capable of being converted into pour depressors, namely, the class of lower alkylated phenols containing short chained alkyl groups, i. e., less than a total of about 12 carbon atoms.

It is already known that pour depressors can be made by various condensation reactions involving the use of long chained aliphatic compounds, as for example, the condensation of chlorinated paraffin wax with naphthalene; and it is also known that pour depressors can be made by acylation of alkylated phenols having long chained alkyl groups such as those derived from paraffin wax. However, it has generally been considered necessary by those skilled in the art when making pour depressors to always use at least one reactant having long chained aliphatic groups, and it was also usually considered desirable to have a plurality of such long chained aliphatic groups present for each aromatic molecule present. However, by means of the present invention a way has been discovered for obviating the necessity of either of those two factors, namely, the long chained aliphatic groups and the use of a plurality of such groups.

Broadly, this invention comprises the production of wax-modifying agents by chemically condensing an aliphatic-substituted hydroxy aromatic compound containing aliphatic groups having only less than 12 carbon atoms and containing as little as only one such group, with an acylating agent.

The aliphatic-substituted hydroxy aromatic compound to be used should preferably have the general formula $R_nAr$—OH, in which R represents an aliphatic group, preferably an alkyl group, having less than 12 carbon atoms, $n$ is 1 to 4, preferably 1 to 2, and Ar is an aromatic nucleus. If the acylating agent is aliphatic, the number of carbon atoms in the phenolic R group should be about 1 to 5, there being a total of about 1 to 10 aliphatic carbon atoms in $R_n$; whereas if the acylating agent is aromatic, the number of carbon atoms in the phenolic R should be about 4 to 10, with a total of about 4 to 20 aliphatic carbon atoms in $R_n$.

The phenols and naphthols containing low molecular weight aliphatic substituents are typical members of this class of compounds. Some specific examples include the various amyl phenols such as para-tertiary amyl phenol, isobutyl phenol, n-butyl phenol, isopropyl phenol, n-propyl phenol, cresols, di-butyl phenol, di-amyl phenol, sec. hexyl phenol, iso-octyl (di-isobutyl) phenol, di-isooctyl phenol, etc., as well as mono-amyl, alpha- or beta-naphthol, butyl naphthols, propyl naphthols, etc. It should be understood that the alkyl groups can be located in various positions around the aromatic nucleus in respect to the hydroxyl group and that the alkyl groups may be straight chained or branched. Also, there can be two or more hydroxy groups and there can be two or more alkyl groups present, although the results are generally at least as good with only a single alkyl group, if not better, as compared with two or more alkyl groups.

Instead of the naphthalene nucleus other polynuclear aromatic compounds may be used, such as suitable alkylated and hydroxy derivatives of anthracene, phenanthrene, diphenyl, etc.

Although there are some alkylated phenols on the market, i. e., commercial products, such as tertiary amyl phenol, petroleum phenols, etc., which are suitable for use according to the present invention, it is possible to start with an unalkylated phenol and treat it with a low molecular weight alkyl halide or an olefin in the presence of a Friedel-Crafts type catlyst, such as aluminum chloride, in order to make the alkylated phenol, as for instance, by reacting ordinary phenol with amyl chloride in the presence of aluminum chloride to produce para-amyl phenol. The resulting reaction mass containing the amyl phenol can be used directly for the present invention without isolating the amyl phenol itself. This can be done merely by adding the dibasic acid as acylating agent, and, if necessary, by adding an additional quantity of catalyst.

The acylating agent to be used according to the present invention should be organic dibasic acid and may either have the general formula $(CH_2)_n(COOH)_2$, where $n$ equals 0 to 30 or more, preferably 2 to 10, or may have the general formula $Ar'(COOH)_2$, where $Ar'$ represents an aromatic nucleus such as the nucleus $C_6H_4$, in phthalic acid or phthalic anhydride. The acylating agent is preferably used in the form of the acid halide or the acid anhydride. Specific examples of suitable aliphatic acylating agents are the acid chlorides or acid anhydrides of the following acids: oxalic, malonic, succinic, glutaric, adipic, pimelic, suberic, and sebacic. Other aromatic acylating agents include: diphenic acid, naphthalic acid, pyridine dicarboxylic acid, etc.

To effect the condensation of the alkylated hydroxy aromatic compound containing low molecular weight alkyl groups, with the acylating agent, according to the present invention, it is preferable to use a Friedel-Crafts catalyst, particularly aluminum chloride, although other Friedel-Crafts catalysts may be used, such as boron fluoride, zinc chloride, ferric chloride, titanium tetrachloride, boron trichloride and in some cases even anhydrous hydrogen fluoride.

The condensation is preferably carried out in the presence of inert solvents, such as a highly refined naphtha or kerosene, tetrachlor-ethane, carbon disulfide, etc., although if desired, the use of the solvent may be dispensed with.

The proportions in which the reactions should be used should usually be about ½ to 10 mols, preferably 1 to 5 mols, of the aliphatic-substituted hydroxy aromatic compound to 1 mol of the dibasic acid acylating agent. The amount of catalyst to be used should usually be about 0.2 to 3.0 mols, preferably 0.5 to 2.0 mols per mol of acylating agent. If a solvent is used, the volume thereof should usually be about ½ to 10, preferably 1 to 5, times the total volume of the reactants to catalyst.

In carrying out the invention, the reaction temperature should be maintained between the approximate limits of room temperature and about 400° F., preferably between about 100° F. and 300° F. The preferred procedure is to add the catalyst to the reactants gradually at room temperature, and then to heat the reaction mass to the desired maximum temperature, maintain it there, such as by refluxing it for the desired length of time, which would normally be between about 10 minutes and 10 hours, preferably about ½ hour to 5 hours. The temperature and time should be adjusted to give the maximum yield of pour depressor having the desired pour depressing potency.

After the reaction has been completed, the reaction mixture is cooled and preferably diluted with an inert diluent, such as a refined kerosene, then the catalyst is hydrolyzed and neutralized by any of the known methods, such as by using a mixture of water and alcohol, or an aqueous solution of caustic soda, or even plain water or plain alcohol. The whole mass is then allowed to settle and the aqueous catalyst layer is drawn off. The upper or kerosene layer containing the desired condensation product dissolved therein, is then subjected to distillation, preferably under low partial pressure as by the usual vacuum, or by distillation with fire and steam, up to a suitable temperature such as about 600° F.

The condensation product of this invention is soluble in mineral lubricating oils and has a fairly high molecular weight, as it is substantially non-volatile at temperatures below about 600° F. It usually has a color ranging from a green to a brown and has a physical consistency or texture ranging from a viscous oil to a resin, in some cases having an intermediate gummy consistency.

Although the chemical structure of the products of this invention has not been determined with certainty, it is believed that they may be represented by a linear-chained structure having alternate aromatic nuclei, in case the acylating agent used was an aliphatic dibasic acid, or a linear type chin built up of different types of aromatic nuclei, one type of which was derived from the alkylated hydroxy aromatic compounds and the other of which was derived from an aromatic dibasic acid. In any case, however, the linear chain type structure also possesses some free aliphatic groups which originated as substituents on the hydroxy aromatic compounds used as raw material. The success of this invention may in part be due to the better solubility of short aliphatic groups, having less than 12 carbon atoms, in waxy mineral oils, as compared to long straight chain paraffinic groups such as that of paraffin wax.

The product of this invention has the property of modifying the crystal structure of waxes such as paraffin wax present when added to compositions containing the same. For instance, when about .05–10.0%, preferably 0.2–5.0%, of this wax modifier is added to a waxy lubricating oil such as a Pennsylvania type lubricating oil having a relatively high pour point, the resultant blend will have a substantially lower pour point; in other words, this wax modifier is an effective pour depressor for waxy oil. A small amount of this wax modifier is also useful as a dewaxing aid for removing wax from mineral lubricating oils of undesirably high wax content. In similarly small amounts, this wax modifier may also be incorporated into paraffin wax or compositions containing the same to be used for various purposes such as for coating or impregnating paper, etc., or for making various molded products.

For the sake of illustration, but without limiting the invention to the particular materials used, the following experimental data are given:

34 grams of sebacic acid were treated with 25 grams of phosphorous trichloride on the water bath. The resulting sebacyl chloride was decanted from the phosphorous acid into a solution comprising 120 grams of tert-amyl-phenol dissolved in 200 cc. of tetrachlorethane used as solvent. 55 grams of anhydrous $AlCl_3$ were then slowly added to the reaction mixture. After the addition of the $AlCl_3$, the reaction mixture was refluxed under a return condenser for 30 minutes. At the end of this time, the reaction mixture was cooled, diluted with kerosene, and the $AlCl_3$ destroyed by the addition of water. After settling, the kerosene extract was distilled with fire and steam to 600° F., in order to remove solvent and low-boiling products. A bottoms residue comprising 64 grams of a brown viscous gummy substance was obtained as product.

When 2% of this condensation product was added to a waxy oil, the pour point of which was +30° F., the pour point was found to be −5° F.

A number of other tests were made using sebacic acid chloride and more or less the same general procedure as that described above, except that several different alkylated phenols were used and various proportions of both reactants, and the reaction time was varied. The results of all these tests are summarized in the following table.

Table

| Test No. | Alkylated Phenol | | Dibasic Acid Acylating Agent | | Cat. AlCl$_3$ Gm. | Solvent | | Temp., °F. | Time, Hrs. | Product | | |
|---|---|---|---|---|---|---|---|---|---|---|---|---|
| | Name | Gm. | Name | Gm. | | Name | cc. | | | Yield, Gm. | Pour Point in 2% Blend,[1] °F. | Appearance |
| 1 | t.-amyl phenol | 120 | Sebacic acid | 34 | 55 | C$_2$H$_2$Cl$_4$ | 200 | Reflux | ½ | 64 | −5 | Brown visc. gummy. |
| 2 | ...do... | 60 | ...do... | 34 | 55 | ...do... | 200 | ...do... | ½ | 85 | −10 | Do. |
| 3 | Di-amyl phenol | 94 | ...do... | 40 | 54 | ...do... | 200 | ...do... | 3 | 127 | −20 | Green visc. oil. |
| 4 | ...do... | 47 | ...do... | 40 | 54 | ...do... | 200 | ...do... | 3 | 56 | −10 | Dark brown resin. |

[1] Blend in a waxy lubricating oil base stock have a pour point of +30° F.

It is noted that in all four of the above tests the condensation product produced a 35° to 50° F. lowering of the original pour point (+30° F.) of waxy lubricating oil base stock, when added thereto a concentration of 2%. These results are quite remarkable and unexpected, in view of the fact that the prior art has considered that it is practically a necessity to use long aliphatic hydrocarbon chains, and preferably a plurality of same, in making condensation products for use as pour depressors.

The following additional example is given to illustrate the application of the invention to the use of an aromatic acylating agent, specifically phthalyl chloride.

Test 5

150 grams of diisobutylphenol were dissolved in 200 cc. of tetrachlorethane as solvent and 50 grams of aluminum chloride added. 50 grams of phthalyl chloride are added to the reaction mixture with stirring over a period of about 30 minutes. After the addition of the phthalyl chloride the reaction temperature was increased to 225° F. and maintained thereat for 3½ hours. After cooling, the reaction mixture was diluted with a further quantity of solvent and the aluminum chloride destroyed by a mixture of alcohol and water. After settling and removing the sludge layer, the product was recovered by fire and steam distillation to 600° F. in order to remove solvent and low boiling products. 64 grams of a dark brittle resin were obtained as product.

The pour depressant potency of the condensation product prepared as described above was tested by blending to 5% concentration in a waxy mineral oil having an initial pour point of +30° F. and testing the resulting pour point of the blend by the standard A. S. T. M. procedure. A pour point of −10° F. was found.

This application is a division of Serial No. 560,193 filed October 24, 1944, now Patent No. 2,477,306, which is a continuation-in-part of copending application Serial No. 372,195, filed December 28, 1940, now Patent 2,366,735.

It is not intended that this invention be limited to any of the specific examples which were given merely for the sake of illustration nor to any theory as to the mechanism of the operation of the invention, but only by the appended claims in which it is intended to claim all novelty inherent in the invention as broadly as the prior art permits.

What is claimed is:

1. A composition comprising a major proportion of a waxy mineral oil and, associated therewith, a minor proportion of a wax-modifier consisting essentially of a Friedel-Crafts condensation product about 1 to 5 mols of a compound containing not more than 20 aliphatic carbon atoms and having the general formula R$_n$Ar—OH, in which R is an aliphatic group having less than 12 carbon atoms, $n$ equals 1 to 2 and Ar is an aromatic nucleus, with about 1 mol of an aromatic dibasic acid acylating agent having the general formula Ar'(COX)$_2$, in which Ar' represents an aromatic nucleus and X is selected from the class consisting of OH and a halogen, said condensation product being substantially non-volatile at temperatures up to about 600° F.

2. A composition comprising a major proportion of a waxy mineral lubricating oil and a minor proportion of a wax modifier consisting essentially of a Friedel-Crafts condensation product of about 1 to 5 mols of a phenolic compound having the general formula R—Ar—OH, in which R is an alkyl group having 4 to 10 carbon atoms, and Ar is an aromatic nucleus, with about 1 mol of an aromatic dibasic acid acylating agent having the general formula Ar'(COX)$_2$, in which Ar' represents an aromatic nucleus and X is selected from the class consisting of OH and a halogen, said condensation product being substantially non-volatile at temperatures up to about 600° F.

3. Composition according to claim 2 containing a condensation product of about 1 to 5 mols of the phenolic compound with 1 mol of phthalic acid chloride.

4. A composition comprising a major proportion of a waxy mineral lubricating oil and a pour depressing amount of a Friedel-Crafts condensation product of about 1 to 5 mols of di-isobutyl phenol with about 1 mol of phthalic acid chloride.

EUGENE LIEBER.

REFERENCES CITED

The following references are of record in the file of this patent:

UNITED STATES PATENTS

| Number | Name | Date |
|---|---|---|
| 2,147,547 | Reiff | Feb. 14, 1939 |
| 2,366,735 | Lieber | Jan. 9, 1945 |
| 2,477,306 | Lieber | July 26, 1949 |